(12) United States Patent
Boegli et al.

(10) Patent No.: US 9,156,107 B2
(45) Date of Patent: Oct. 13, 2015

(54) METHOD AND DEVICE FOR STRUCTURING THE SURFACE OF A HARD MATERIAL COATED SOLID BODY BY MEANS OF A LASER

(75) Inventors: Charles Boegli, Marin (CH); Steffen Weissmantel, Chemnitz (DE); Günter Reisse, Chemnitz (DE); Andy Engel, Colditz (DE); Rene Boettcher, Mittweida (DE); Werner Steffen, Stansstad (CH)

(73) Assignee: Boegli-Gravures S.A., Marin (CH)

( * ) Notice: Subject to any disclaimer, the term of this patent is extended or adjusted under 35 U.S.C. 154(b) by 615 days.

(21) Appl. No.: 13/260,167

(22) PCT Filed: Mar. 18, 2010

(86) PCT No.: PCT/CH2010/000075
§ 371 (c)(1),
(2), (4) Date: Sep. 23, 2011

(87) PCT Pub. No.: WO2010/111799
PCT Pub. Date: Oct. 7, 2010

(65) Prior Publication Data
US 2012/0012594 A1    Jan. 19, 2012

(30) Foreign Application Priority Data

Mar. 30, 2009 (EP) ..................................... 09156588
Nov. 25, 2009 (EP) ..................................... 09405204

(51) Int. Cl.
*B23K 26/00* (2014.01)
*B23K 26/06* (2014.01)
*B23K 26/40* (2014.01)

(52) U.S. Cl.
CPC ......... *B23K 26/0604* (2013.01); *B23K 26/0084* (2013.01); *B23K 26/063* (2013.01);
(Continued)

(58) Field of Classification Search
CPC ....................................................... G02B 5/005

USPC .......................................................... 427/596
See application file for complete search history.

(56) References Cited

U.S. PATENT DOCUMENTS 4,269,473 A * 5/1981 Flothmann et al. ................ 359/2
4,916,322 A * 4/1990 Glavish et al. ............. 250/492.2
(Continued)

FOREIGN PATENT DOCUMENTS

CN        101161482        4/2008
DE   10 2005 043 495 A1    3/2007
(Continued)

OTHER PUBLICATIONS

Milani et al. "Surface periodic structures induced by pulsed laser irradiation of fullerite". Applied Physics Letters 68, p. 1769 (1996).*
(Continued)

*Primary Examiner* — Dah-Wei D Yuan
*Assistant Examiner* — Jose Herndandez-Diaz
(74) *Attorney, Agent, or Firm* — Foley & Lardner LLP

(57) ABSTRACT

In the method for structuring at least one area of a solid body surface provided with a ta-C coating, a mask in the homogenous spot of the optical system is used in order to shape the beam in the mask projection technique and then a diaphragm in front of the imaging optics. A structure is applied by means of an excimer laser having pulse durations in the nanosecond range, a number of mask and diaphragm combinations being arranged in a exchanger device and the exchanger device being adapted to place both one of the masks and one of the diaphragms in the beam path of the laser independently of each other, the masks and diaphragms being arranged in holders while being displaceable linearly or rotatively and rotatable about themselves. This method allows the rational manufacture of very complex, extremely fraud-resistant authentication features and/or of esthetically attractive, optical diffraction effective colored patterns.

18 Claims, 7 Drawing Sheets

(52) U.S. Cl.
CPC ......... *B23K26/0635* (2013.01); *B23K 26/0656* (2013.01); *B23K 26/409* (2013.01); *B23K 2201/04* (2013.01); *B23K 2201/34* (2013.01); *B23K 2203/02* (2013.01)

(56) References Cited

U.S. PATENT DOCUMENTS

| | | | |
|---|---|---|---|
| 5,474,816 A * | 12/1995 | Falabella | 427/580 |
| 6,008,914 A | 12/1999 | Sasagawa et al. | |
| 6,303,900 B1 * | 10/2001 | Tachikawa | 219/121.7 |
| 6,333,485 B1 | 12/2001 | Haight et al. | |
| 2002/0086245 A1 * | 7/2002 | Zait et al. | 430/321 |
| 2003/0062347 A1 | 4/2003 | Song et al. | |
| 2004/0149705 A1 * | 8/2004 | Yamada et al. | 219/121.69 |
| 2006/0109531 A1 * | 5/2006 | Watanabe et al. | 359/2 |
| 2007/0080146 A1 * | 4/2007 | Stockum et al. | 219/121.6 |
| 2008/0116610 A1 | 5/2008 | Boegli | |

FOREIGN PATENT DOCUMENTS

| | | |
|---|---|---|
| JP | 63-76783 A | 4/1988 |
| JP | 04-367388 A | 12/1992 |
| JP | 09-253877 A | 9/1997 |
| JP | 2003-205383 A | 7/2003 |
| JP | 2005-144456 A | 6/2005 |
| WO | WO 2007/012215 A1 | 2/2007 |
| WO | WO 2007012215 A1 * | 2/2007 |
| WO | WO 2007135901 A1 * | 11/2007 |

OTHER PUBLICATIONS

Taylor et al. Illumination Fundamentals. Rensselaer Polytechnic Institute (2000).*

Machine translation of WO2007/012215A.*

Office Action in JP application No. 2012-502412 with English translation; mailed Oct. 25, 2013; 4 pages.

Milani, P. et al.; Surface periodic structures induced by pulsed laser irradiation of fullerite; Appl. Phys. Lett. 68 (13), Mar. 25, 1996; pp. 1769-1771; American Institute of Physics.

PCT International Search Report and Written Opinion on application No. PCT/CH2010/00075 mailed Dec. 5, 2010; 8 pages.

Chinese Office Action with English translation; issued Oct. 25, 2013; 19 pages.

* cited by examiner

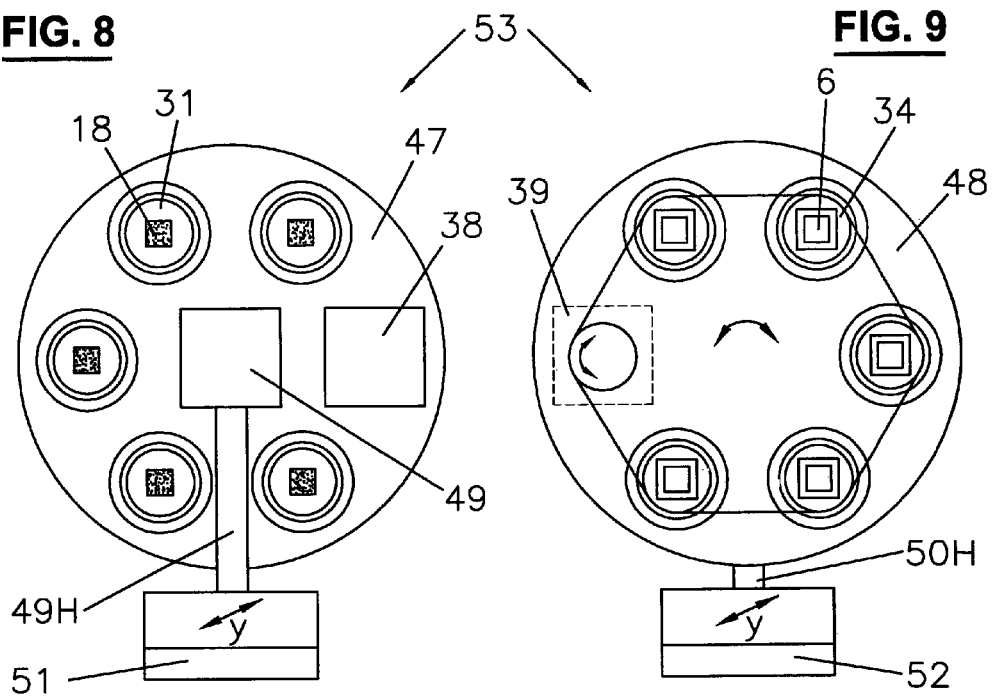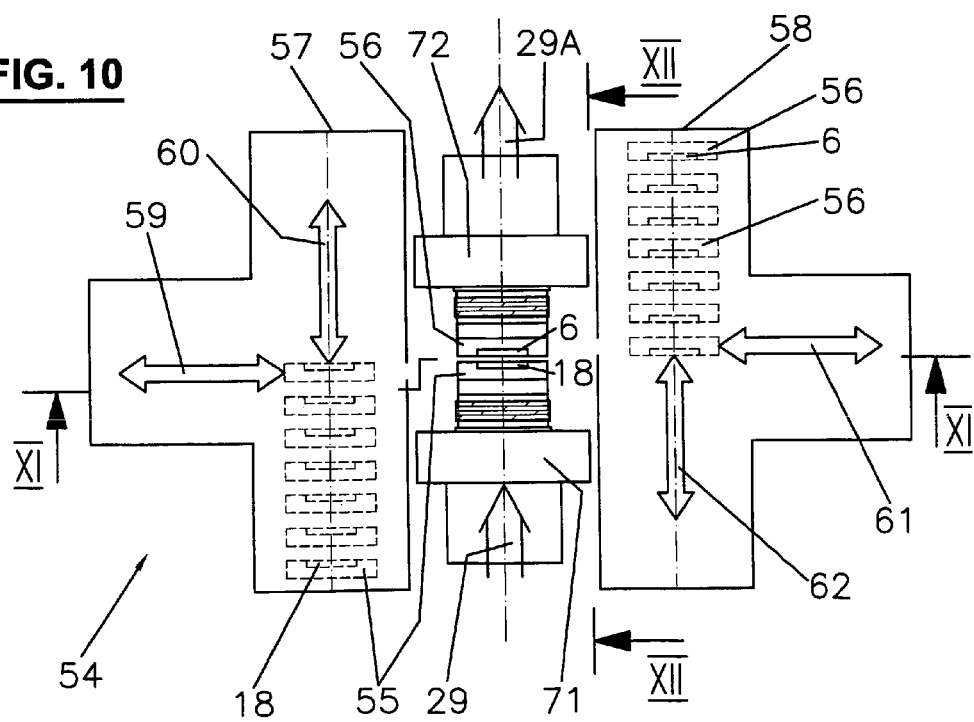

METHOD AND DEVICE FOR STRUCTURING THE SURFACE OF A HARD MATERIAL COATED SOLID BODY BY MEANS OF A LASER

FIELD OF INVENTION

The present invention relates to a method for structuring at least one area of a solid body surface provided with a hard material coating by means of a laser having pulse durations in the nanosecond range according to the mask projection technique and to a device for implementing the said method.

The machined surface may be the surface of an embossing tool such as an embossing roller or an embossing die whose surface structure is transferred to a medium such as a packaging foil or the like, or it may be the surface of a piece of jewelry object such as a part of a watch case. Hereinafter, the term "laser" stands for the entire laser system.

BACKGROUND OF THE INVENTION

It is known in the art to use excimer lasers having pulse durations in the nanosecond range and wavelengths in the ultraviolet range for microstructurings. A laser microstructuring of wear-resistant surfaces of solid bodies is mainly required for embossing rollers or embossing dies when these embossing rollers or dies are e.g. intended for embossing fraud-resistant authentication features or particular optical diffraction attractive signs on packaging foils for cigarettes or foods. Such packaging foils are mostly made up of a paper or plastics layer provided with a vapor-deposited or sputtered metal layer, or they are entirely made of metal, mostly aluminum, or entirely of paper or plastics with a surface treatment that produces the optically and optical diffraction effective features and structures. In this respect, masks or diaphragms are preferably used to shape the intensity profile of the laser beam.

WO 2007/012215 to the applicant of the present invention discloses the creation of so-called ripples by means of a femtosecond laser on a workpiece that may be provided with a hard material layer consisting of superhard amorphous carbon having a fraction of more than 50% of diamond-like $sp^3$ bonds known under the designation ta-C, of tungsten carbide, WC, boron carbide, $B_4C$, silicon carbide, SiC, or similar hard materials. As appears from different documents available in the Internet, mainly the superhard amorphous carbon films, ta-C, are very suitable for various applications, more particularly for tribological applications but also for optical diffraction applications.

SUMMARY OF THE INVENTION

On this background, it is an object of the invention to improve the mentioned method for structuring the surface of a solid body, more particularly of an embossing roller for embossing fraud-resistant authentication features and/or optically attractive signs, in such a manner that a series production of such surfaces for producing authentication features having an increased fraud resistance as well as a greater design scope is possible. This object is attained by the method wherein in the homogenous spot of the optical beam shaping system, a mask and then a diaphragm in front of the imaging optics are used, and by the device wherein between the laser and its imaging optics, at least one mask and diaphragm combination is arranged, a number of mask and diaphragm combinations being arranged in a exchanger device and the exchanger device being adapted to place both one of the masks and one of the diaphragms in the beam path of the laser independently of each other, the masks and diaphragms being displaceable linearly or rotatively and rotatable about themselves in holders.

Another object of the invention is to provide a method ensuring the manufacture of masks and diaphragms for the creation of microstructures of high precision and longevity. This object is attained by the method wherein for the manufacture of the masks or diaphragms, a femtosecond laser is used whose radiation produces the surfaces that are opaque to the laser beam on the substrate, preferably a transparent quartz plate, due to increased roughness.

Another object of the invention is to provide a method for measuring and optimizing the manufacturing method. This object is attained by the method wherein during the production of the structures on the workpiece surface, these structures are being measured by means of a diffractometer and the measured values are used for adjusting the beam intensity and/or the imaging and focusing optics, and by the device wherein it comprises a diffractometer having at least one CCD array for measuring the radiation reflected and diffracted by the excimer laser and the femtosecond laser structures, respectively. Further exemplary embodiments are defined in the dependent claims.

BRIEF DESCRIPTION OF THE DRAWINGS

The invention will be explained in more detail hereinafter with reference to drawings of exemplary embodiments.

FIG. 8 shows the exchanger device of FIG. 7 according to the direction indicated by arrow VIII in FIG. 7, FIG. 9 shows the exchanger device of FIG. 7 according to sectional plane IX-IX in FIG. 7, FIG. 10 shows a schematic diagram of another embodiment of a mask and diaphragm exchanger device having magazines for masks and diaphragms.

DETAILED DESCRIPTION OF THE INVENTION

Figure 1:
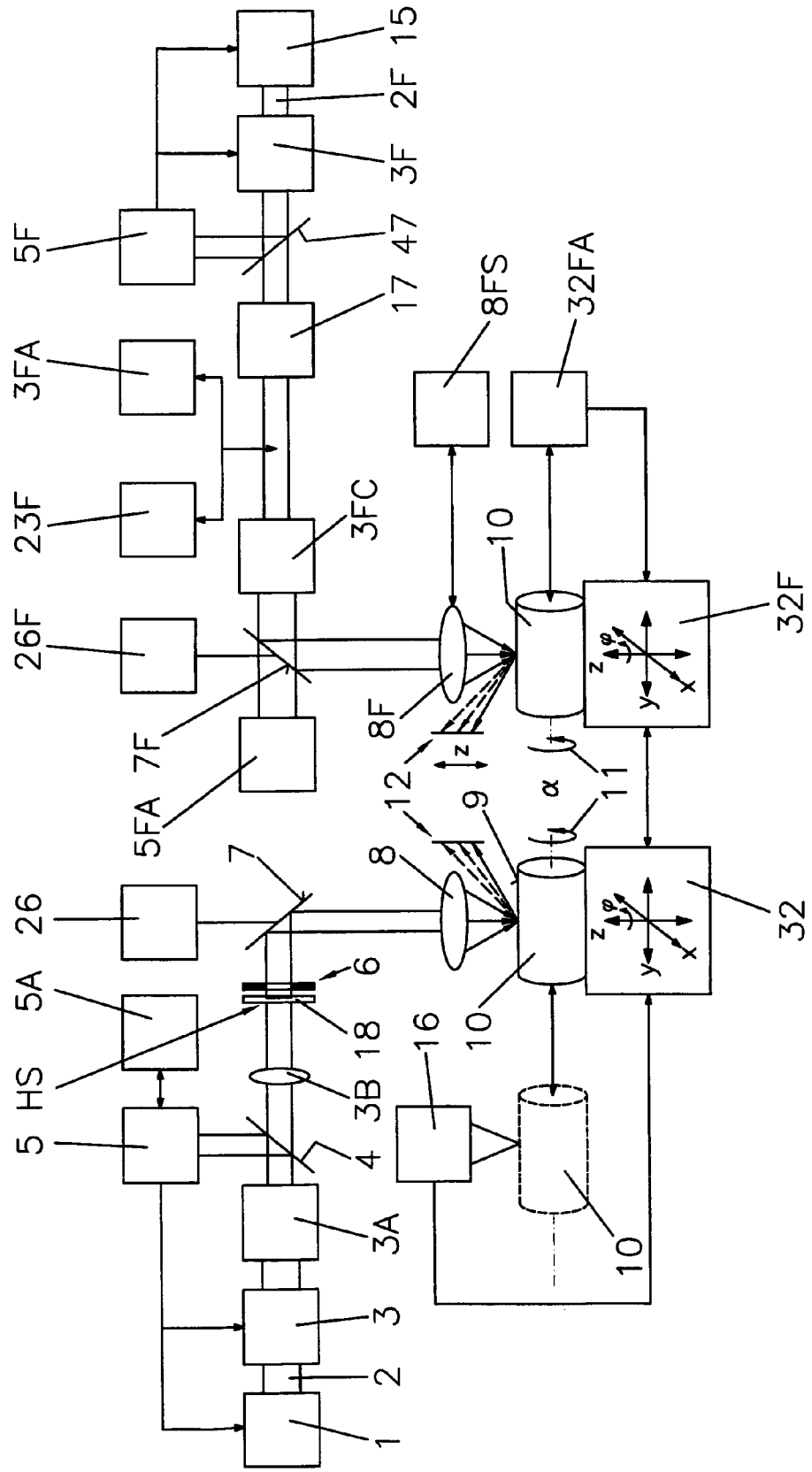
FIG. 1 shows a schematic diagram of a device according to the invention with two lasers.

FIG. 1 shows a schematic diagram of a device according to the invention with two lasers for micro- and nanostructuring ta-C coated embossing rollers, the hard material ta-C standing for hard materials representatively.

The first laser, e.g. a KrF excimer laser having a wavelength of 248 nanometers (nm), produces microstructures in the ta-C layer according to the mask projection technique, and the second laser, a femtosecond laser having a center wavelength of 775 nm, produces nanostructures in the ta-C layer according to the focus technique.

The microstructures may e.g. be trench-shaped grating structures having grating periods of 1 to 2 μm, and the nanostructures may e.g. by self-organized ripple structures having periods of approx. 500 nm which act as an optical diffraction grating. In this respect, any periodic array of the optical diffraction active structures is possible that produces an angular-dependent dispersion, i.e. a separation into spectral colors, by diffraction upon irradiation with polychromatic light.

In FIG. 1, a first laser, an excimer laser 1 is shown whose beam 2 has a rectangular cross-section here. The intensity of this laser beam can be adjusted and varied by an attenuator 3. By means of homogenizer 3A and field lens 3B, a homogenous intensity distribution across the laser beam cross-section is obtained in homogenous spot HS. The intensity profile across the laser beam cross-section that is required for the microstructure to be produced is shaped from this homogenous intensity distribution by means of mask 18 positioned in homogenous spot HS.

The geometrical shape of the opening in diaphragm 6 arranged after the mask, and preferably in contact therewith, produces the cross-sectional geometry or contour shape of the intensity profile of the laser beam shaped by mask 18. Mask 18 and diaphragm 6 are comprised in a mask and diaphragm exchanger device that will be described in more detail below.

Instead of a KrF excimer laser, an ArF excimer laser having a wavelength of 193 nm, a fluor laser having a wavelength of 157 nm, or a XeCl excimer laser having a wavelength of 308 nm can be used as the first laser.

Figure 2:
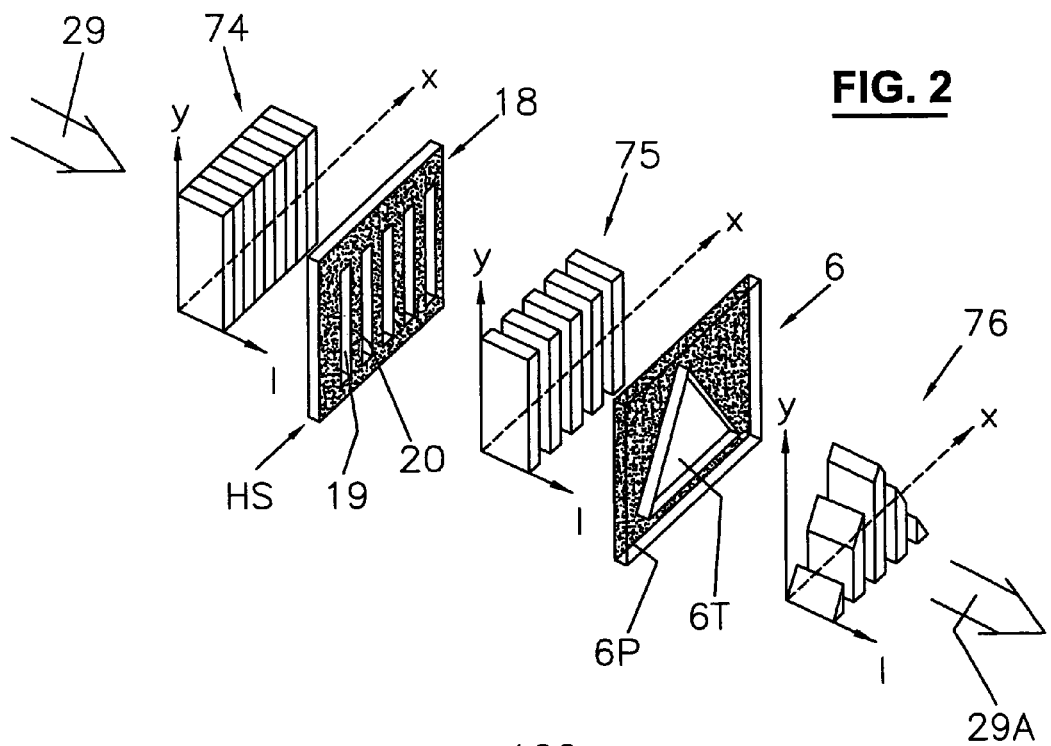
FIG. 2 shows the beam intensity shaping by means of a mask and diaphragm combination.

The laser beam shaped by mask 18 and diaphragm 6, see also FIG. 2, impinges on a deflection mirror 7 that guides the beam through an appropriate imaging optics 8 for this laser beam which forms the image of the appropriate laser intensity profile for the microstructure onto surface 9 of the ta-C layer on embossing roller 10 at a predetermined imaging scale of e.g. 8:1. By rotation arrows 11 it is indicated that embossing roller 10 can be rotated about its longitudinal axis by predetermined angles. Embossing roller 10 is arranged on a transfer device 32.

In order to adjust, monitor, and stabilize the power and thus the intensity of the laser beam, a small fraction of the laser beam is directed by means of beam splitter 4 onto a power meter 5 that delivers data for the control of attenuator 3 and/or laser 1. This power meter 5 may selectively be exchanged for a laser beam intensity profile measuring device 5A, which is indicated by a double arrow in FIG. 1. Devices 5 and 5A are positioned at the same distance from beam splitter 4 as mask 18 located in homogenous spot HS in order to allow a correct measurement of the power and of the intensity distribution of the laser beam in homogenous spot HS, i.e. in the mask plane. A camera 26 serves for observing the microstructuring process. To this end, deflection mirror 7 has an interference layer system that reflects the excimer laser radiation of 248 nm wavelength but transmits visible light.

To adjust a precisely determined focal position of the laser beam imaged by imaging optics 8 onto the ta-C layer to be structured over the entire surface area of embossing roller 10, the position and the production-related deviations of the embossing roller from the ideal geometry are measured by means of device 16 for the position survey of the embossing roller, e.g. by means of trigonometric measuring methods. These measuring data are then used for the automatic adjustment of embossing roller 10 by means of displacing device 32 and for the correction control of the z-axis of displacing device 32 during the structuring process.

As already briefly mentioned in the description of the exemplary embodiment according to FIG. 1, the intensity profile required for the excimer laser structuring process according to the mask projection technique is shaped by means of a mask and a diaphragm.

This process will be explained in more detail herebelow with reference to FIG. 2: From the homogenous intensity distribution of laser beam 29 in homogenous spot HS, the intensity profile across the laser beam cross-section required for the microstructure to be produced in the ta-C layer on embossing roller 10 is shaped by means of mask 18 positioned in homogenous spot HS. In the present schematic view, mask 18 has transparent areas 19 arranged in a grid-like manner and surface areas 20 that are opaque to the laser beam, and thus forms a grid-like intensity profile 75 with cuboidal intensity profile portions.

Diaphragm 6, which is arranged in the direction of the laser beam after the mask and preferably in contact therewith, produces the cross-sectional geometry of the intensity profile of the laser beam shaped by mask 18 by the geometrical shape of its opening or transparent surface area. In the present illustration, the shape of diaphragm opening 6T or the surface area of the diaphragm within the opaque portion 6P that is transparent to the laser beam is in the form of a triangle, and consequently, after the diaphragm, the intensity profile 76 of laser beam 29A exhibits a triangular cross-sectional geometry.

In FIG. 2, the grating period of mask 18 and the thickness as well as the spacing of the cuboidal intensity profile portions of laser beam intensity profile 76 after the mask are depicted on a strongly enlarged scale in the x coordinate direction; actually, at an imaging ratio of the mask projection system of 8:1, they only measure e.g. 8 to 16 μm in order to produce optically effective trench-shaped microstructures having grating periods of 1 to 2 μm in the ta-C layer on embossing roller 10 by means of laser beam 29A shaped by the mask. In reality, with equal sizes of the surface areas of homogenous spot HS and of the structured area of mask 18 of e.g. 8 mm×8 mm=64 mm$^2$, the structured mask area, in contrast to the schematic illustration of FIG. 2, consists of a stripe grating having 1000 to 500 grating periods, and the laser beam shaped therewith consists of 1000 to 500 cuboidal intensity profile portions.

The size, shape, spacing, position, and number of transparent surface areas of mask 18, hereinafter called the mask structure, determine the laser beam intensity profile for creating the microstructure in the ta-C layer having a predetermined optical effect, and diaphragm 6 determines the cross-sectional geometry of the laser beam intensity profile and thus the geometrical shape of the microstructured basic area on the embossing roller. The term "basic area" is used here to designate the surface on the embossing roller or embossing die that is structured by the laser beam shaped by the mask and the diaphragm and imaged onto the ta-C coated roller surface in a laser beam pulse train (pulse sequence) without a relative movement of the laser beam and the roller surface.

Consequently, by a variation of the mask structure, and particularly by rotating the mask about the optical axis of the laser beam by predetermined angles, the orientation of the laser beam intensity profile shaped by the mask and imaged on the ta-C layer of the embossing roller by means of focusing optics 8 can be varied and thus the optical effect of the microstructured basic area upon irradiation with polychromatic light, e.g. the viewing direction and the viewing angle, as well as color and intensity.

By rotating diaphragm 6 about the optical axis of the laser beam by predetermined angles, the orientation of the cross-sectional geometry shaped by the diaphragm of the laser beam imaged on the ta-C layer on the embossing roller by means of the focusing optics is varied and thus the orientation of the laser-structured basic area on the surface of the embossing roller. This procedure is described herebelow.

The microstructured basic areas may either be juxtaposed according to a particular pattern or, after rotating the mask by a predetermined angle, superposed by the same microstructure under this predetermined angle. Furthermore, if different masks are used, different microstructures can be superposed in an basic area, thereby creating new optical diffraction effects upon irradiation with polychromatic light. If they are juxtaposed, the basic areas may have the same or different surface shapes and microstructures.

Figure 3:
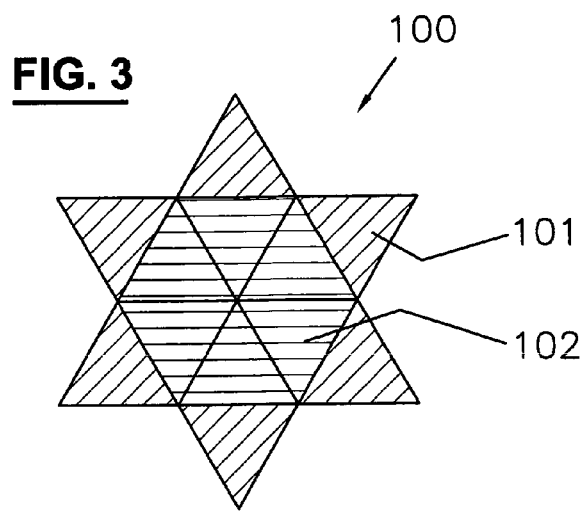
FIG. 3 shows a microstructured area having the shape of a star.

FIG. 3 schematically shows a microstructured six-rayed star 100 that is composed of twelve basic areas of triangular cross-sectional shape in six different orientations and exhibits two different orientations of the light-diffracting, line grating-shaped microstructures within the basic areas. When this star is viewed in polychromatic light, the similarly microstructured inner hexagon 101 composed of six triangular basic areas and the similarly microstructured rays 102 of the star appear in different colors and different intensities in the same viewing direction and under the same viewing angle. When the viewing direction is changed by rotating the star about its orthogonal symmetry axis or when the viewing angle is changed by inclining the star surface, both the color and the intensity of the light diffracted by the inner hexagon and the rays change.

For excimer laser microstructuring complicated surface areas composed of a large number of basic areas that may optionally also have different surface shapes and parts of which produce different optical effects on the ta-C coated embossing roller, multiple masks having different mask structures and multiple diaphragms having different diaphragm opening geometries have to be used, mask 18 and diaphragm 6 being rotatable about the optical axis of the laser beam independently of each other by a predetermined angle $\alpha$. More specifically, $\alpha$ may take on a value between 1° and 180°.

The following machining parameters are e.g. appropriate for structuring the ta-C layer on the embossing roller: Pulse repetition frequency of the excimer laser 30 Hz, laser beam fluence on the layer 8 J/cm$^2$, number of laser pulses per basic area 10.

Figure 13:
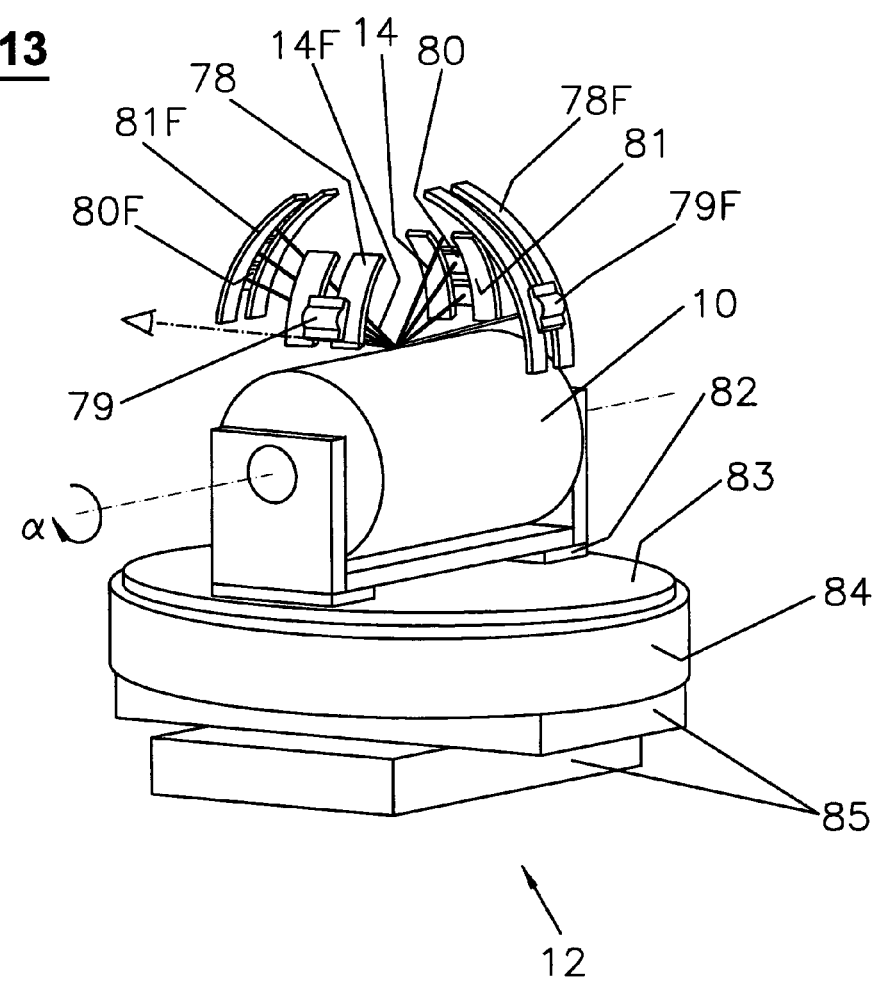
FIG. 13 shows a schematic diagram of a diffractometer for measuring and adjusting the masks, diaphragms, and embossing rollers as well as for quality control in the production of structurings on an embossing roller.

In order to optimize the adjustment of mask 18 and diaphragm 6, an in situ diffractometer arrangement 12 is used, see FIGS. 1 and 13, where a measuring laser beam of a laser 79 is directed onto the roller surface and the rays 14 reflected and diffracted by the created structures are evaluated by the diffractometer.

According to the invention, for producing even finer microstructures, according to FIG. 1, a second laser 15 is additionally used that may be a femtosecond or picosecond laser. Laser beam 2F is emitted with a Gaussian intensity distribution across the circular cross-section of the beam whose intensity is adjustable and variable by means of attenuator 3F. By means of polarizer 17, the polarization direction of the laser beam is varied, i.e. the direction of the electric field intensity vector in the xz plane orthogonal to the propagation direction y of the laser beam.

In order to achieve very small focus cross-sections in the ta-C layer, the cross-section of the unfocused laser beam is enlarged in beam expander 3FC. The linearly polarized and expanded laser beam is deviated by mirror 7F and focused onto the ta-C layer by means of focusing optics 8F that is appropriate for the wavelength of the femtosecond laser and mounted displaceably in the z direction.

To adjust, control, and stabilize the power and thus the intensity of the laser beam, a small fraction of the laser beam is directed by means of beam splitter 4F onto a power meter 5F that delivers data for the control of attenuator 3F and/or laser 15. A camera 26F serves for observing the structuring process. Deflection mirror 7F is coated in a suitable manner for reflecting the femtosecond laser radiation while transmitting visible light.

In order to structure predetermined surface areas, a relative movement between the laser beam focused onto the ta-C layer of the embossing roller and the roller surface has to be accomplished by rotating the embossing roller by predetermined angular ranges $\alpha$ and $\Phi$ displacing it in the x and y directions. This relative movement is accomplished by a displacing device 32F.

Optionally, a homogenizer 3FA that transforms the Gaussian intensity distribution across the laser beam cross-section into a homogenous intensity distribution and/or a device 23F for doubling or tripling the frequency of the laser beam may be inserted into the beam path of the femtosecond laser beam in order to be able to perform the structuring process with a homogenous intensity distribution and shorter laser beam wavelengths also. This is e.g. advantageous for the manufacture of masks 18 and diaphragms 6 from quartz glass by femtosecond laser structuring.

If the frequency doubling device 23F is used, beam expander 3FC, deflection mirror 7F, and focusing optics 8F must be suitable for the shorter wavelength.

Alternatively, instead of focusing optics 8F, a scanner 8FS with an adapted objective may be used, thereby allowing to realize a faster relative movement between the laser beam focused onto the ta-C layer of the embossing roller and a limited surface area of the roller surface dependent upon the scanner parameters so that the time required for structuring this limited surface area can be substantially reduced as compared to the relative movement accomplished by means of displacing system 32F. If the scanner mirror deflection system 8FS is used, displacing system 32F only serves for juxtaposing multiple already structured limited surface areas when larger surface areas on the embossing roller are to be structured.

By means of distance measuring system 32FA, the focal position of the laser beam is adjusted and monitored before the structuring process and alternatingly with the structuring process.

The femtosecond laser structuring according to the focus technique is mainly used for creating self-organized, optical diffraction effective ripple structures in the ta-C layers on embossing roller 10. These ripple structures may e.g. be parallel wave grating structures having grating periods of 500 to 800 nm and trench depths of 300 nm where the parallel ripples, as already described in PCT application WO 2007/012215 to the applicant of the present invention, are always perpendicular to the polarization direction of the laser beam.

In analogy to the superposed microstructures produced by the excimer laser in an basic area, a femtosecond laser ripple structure produced by femtosecond laser beam pulses may be superposed with a second ripple structure whose orientation is different from the first ripple structure due to a variation of the polarization direction of the laser beam. Furthermore it is possible to superpose a microstructure produced in an basic area by means of the excimer laser with a ripple structure produced by means of the femtosecond laser, thereby creating further new optical diffraction effects upon irradiation with polychromatic light since the optical effect of the microstructure produced by the excimer laser is superposed by the optical diffraction effect of the ripple structure produced by the femtosecond laser.

The following machining parameters are e.g. suitable for producing the ripple structures in ta-C: Displacing speed 15 mm/s, center wavelength 775 nm, pulse duration 150 fs, pulse repetition frequency 1 kHz, fluence in the laser beam focus 2.3 J/cm$^2$, Gaussian focus radius 21 µm. The picosecond laser that is alternatively applicable for producing ripple structures may be of the Nd:YAG type with a wavelength of 1064 nm, or a laser of this kind with frequency doubling and a wavelength of 532 nm.

The ripples are produced in the ta-C layer on the embossing roller by scanning the surface line-by-line, the line offset being preferably chosen such that the line spacing corresponds to the spacing of the individual pulses along the line.

For controlling the quality of these nanostructures produced in the ta-C layer on the embossing roller, the same in situ diffractometer 12 as above is used which comprises another white light source or a laser diode and multiple CCD camera arrays for recording the diffraction orders created by the optically effective nanostructures. Alternatively, a second in situ diffractometer might be used. On account of the smaller periods of e.g. 0.5 µm of the wave grating formed by the ripples, as compared to the larger grating periods of e.g. 1 to 2 µm produced in the ta-C layers by the excimer laser, the corresponding diffraction orders appear under smaller angles. The principle of operation of this diffractometer will be described below with reference to FIG. 16.

The structures produced by the excimer laser according to the mask projection technique differ from the structures produced by the femtosecond laser according to the focus technique in their dimensions, the structure depth of the former structures ranging e.g. between 250-450 nm and the grating periods being equal to 1.5 µm, and the structure depth of the latter structures ranging between 250-400 nm and the grating periods between 0.4 to 0.7 µm.

By the superposition of the grating structures produced by an excimer laser and of ripple grating structures produced by a femtosecond laser, an imitation becomes so much more difficult that based on the complicated diffraction patterns created on the packaging foil by embossing, a forgery thereof becomes largely impossible. On the other hand, optically very effectual colored areas are created.

In the present exemplary embodiment, the optical elements except for the focusing optics are fixed, and in order to produce different structured areas on the roller surface, the roller is placed on a cross table that is displaceable in the X and Y plane while being rotatable about its axis. In addition, the roller may furthermore be displaceable in the Z plane. However, instead of displacing the roller relative to the beam, it is also possible to provide an adjusting optics with a scanner as described above or a combination of both possibilities.

As mentioned in the introduction, the roller surface is provided with a ta-C layer that has e.g. been applied by pulsed laser deposition. In WO 2007/012215 cited in the introduction, different coatings are mentioned on which tests have been conducted, and it has been recognized in the meantime that such a superhard tetrahedrally bonded carbon layer produced by pulsed laser deposition is very suitable for the intended very fine structuring. More specifically, layer thicknesses of approx. 1 to 2 µm, more particularly 1.5 µm, may be quite suitable for the intended purposes. To improve the adhesion of the ta-C layer to the underlying material, it is advantageous to provide a WC interlayer having a thickness of 50 to 300 nm.

As indicated schematically in FIG. 1, at least one mask is placed in the beam path of the excimer laser, the mask being located between the excimer laser and the focusing optics. In FIGS. 4 to 12, mask and diaphragm combinations in exchanger devices are depicted and described in more detail.

As a substrate material for the masks and diaphragms, quartz glass of high optical quality is preferably used. Alternatively, however, e.g. calcium fluoride, CaF, or magnesium fluoride, MgF$_2$, may be used. In a preferred exemplary embodiment, the non-transparent mask or diaphragm portion is created by roughening.

Field 26F symbolizes two cameras which serve for process observation, i.e. for observing the surface of the workpiece. Generally, the quartz masks are provided with a regular pattern on a surface area of e.g. 8×8 mm; this pattern may be a simple hatching, but other patterns may also be contemplated and created. Cameras 26F are connected to a monitor. Alternatively, the opaque surfaces in diffraction masks or diaphragms from quartz glass may be produced by the fluor laser according to the focus or mask projection technique. Also, a frequency doubling or tripling may be advantageous if a femtosecond laser is used.

In some simple applications it may be sufficient to provide one quartz mask or quartz masks in a holder to shape the excimer laser beam. In the case of very fine and complicated colored patterns, however, that are mainly also subject to esthetic conditions and should be largely fraud resistant, multiple masks having different mask structures and multiple diaphragms having different diaphragm opening geometries have to be used.

More specifically, the simultaneous shaping of the laser beam intensity profile for producing the microstructures for generating surfaces having a predetermined optical diffraction, i.e. multicolored effect, is achieved by means of a mask, and the shaping of the cross-sectional geometry and consequently of the contour shape of the laser beam for producing the gaplessly tileable predetermined microstructured basic areas with the microstructures having a predetermined optical diffraction effect is achieved by means of a diaphragm.

To this end, the masks and the diaphragms can be changed in a program-controlled manner and in particular independently of one another, and rotated by predetermined angles. The mask structure determines the viewing direction and the viewing angle for the optical effect of the microstructured basic area, and the diaphragm determines the geometrical shape and the surface position of the microstructured basic area having a predetermined optical effect.

The exchange and the rotation of masks and diaphragms can be achieved by means of the mask and diaphragm exchanger and rotation devices described herebelow:

In FIGS. 4 to 12, some embodiments of exchanger devices for mask and diaphragm holders are illustrated; basically, linear or rotary or combined exchanger devices may be contemplated, and it is important in all devices that both the masks and the diaphragms can be exchanged independently of one another and quickly in order to allow a very large variety of patterns. This allows an efficient and economical production of a large number of patterns and authentication features on the underlying workpiece, e.g. an embossing roller or an embossing die, which meet the highest esthetical and optical requirements.

An exchanger device not only allows producing different patterns between one embossing roller and another, but also creating a large number of different structures serving both as authentication features and as esthetically effective patterns very efficiently and quickly on one and the same embossing roller.

Figure 4:
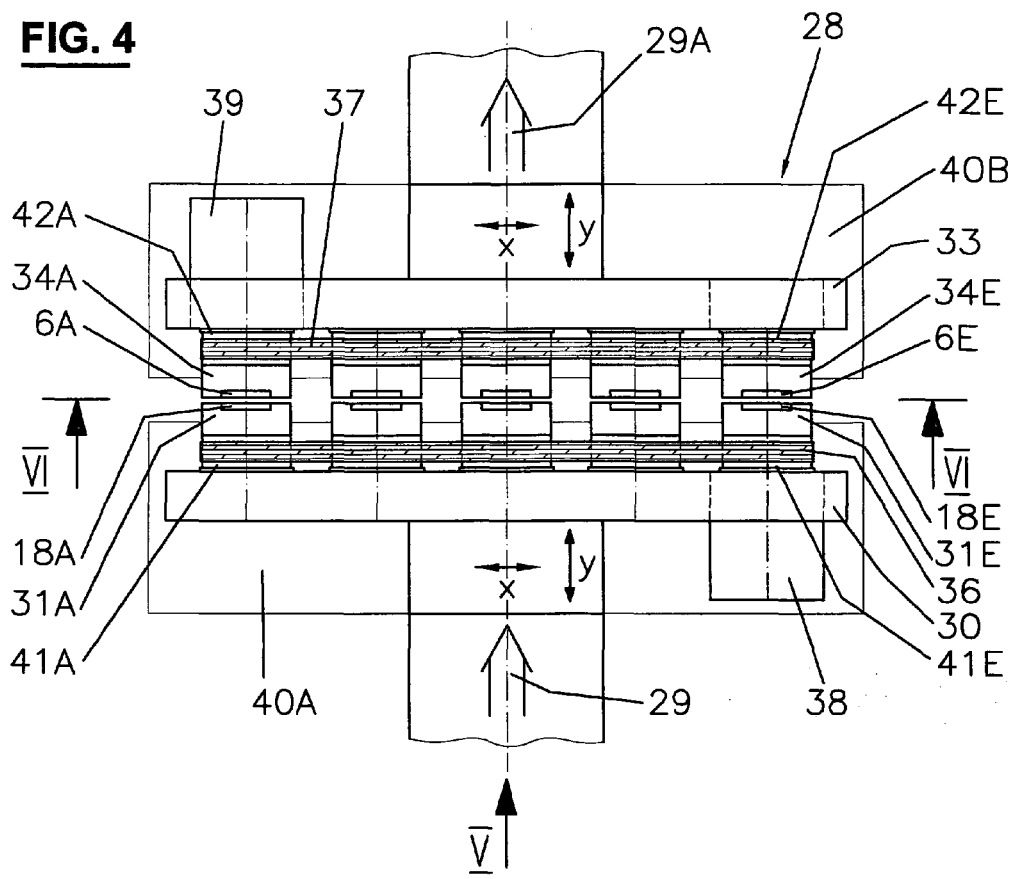
FIG. 4 shows a schematic diagram of a linear mask and diaphragm exchanger device in a top view.
Figure 5:
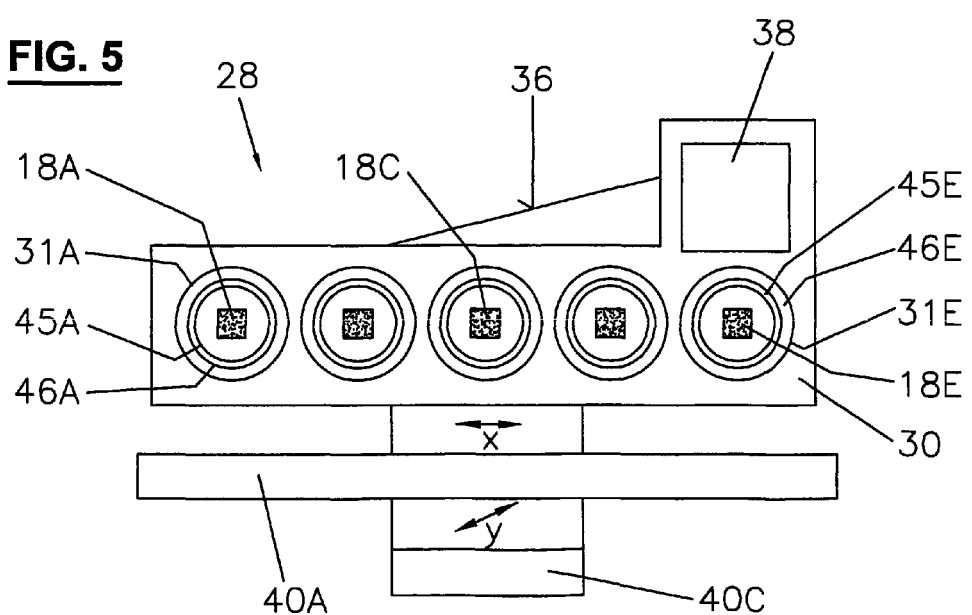
FIG. 5 shows the exchanger device of FIG. 4 according to the direction indicated by arrow V in FIG. 4.
Figure 6:
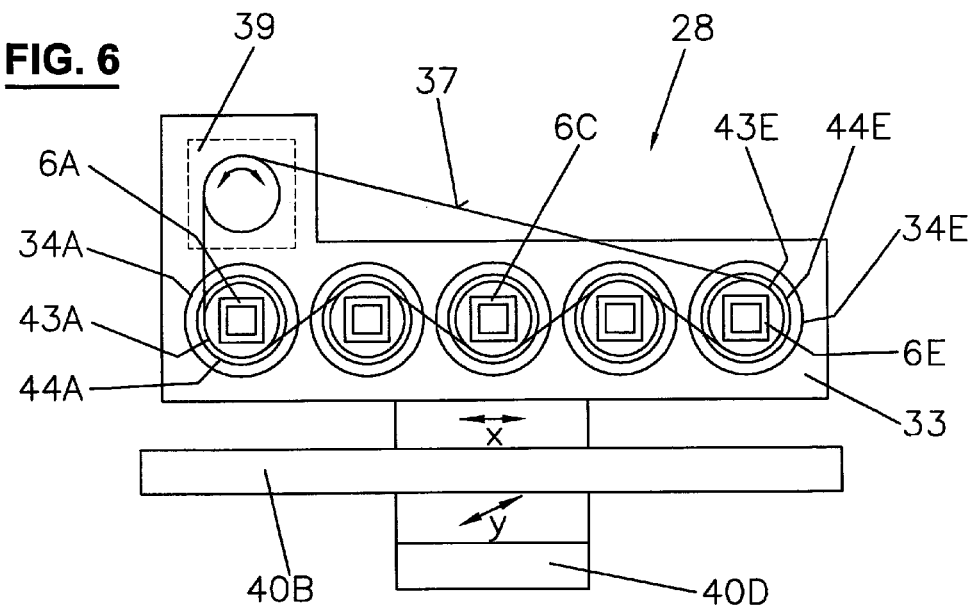
FIG. 6 shows the exchanger device of FIG. 4 according to sectional plane VI-VI in FIG. 4.

A linear exchanger device 28 is depicted in FIGS. 4 to 6. FIG. 4 shows a top view where the impinging laser beam is symbolized by arrow 29 and the shaped laser beam by 29A. The exchanger device has a mounting plate 30 for mask holders 31A to 31E that is mounted on a first x coordinate table axle 40A, see FIG. 5, masks 18A to 18E being inserted in mask holders 31A to 31E. In analogy thereto, the exchanger device has a mounting plate 33 for diaphragm holders 34A to 34E that is mounted on a second x coordinate table axle 40B, see FIG. 9, in which holders the diaphragms GA to GE are inserted. The first and second x coordinate table axles 40A and 40B are mounted on respective y coordinate table axles 40C and 40D.

It is further seen in FIG. 4 that laser beam 29 first passes through a mask and then through a diaphragm, whereby the exiting laser beam 29A is shaped, see also FIG. 2, and then impinges on imaging optics 8 by which the resulting laser intensity profiles are imaged on the ta-C coated roller surface on a reduced scale. The mask holders are moved by a toothed belt 36 and the diaphragm holders by a toothed belt 37 which cooperate with corresponding gearwheels 41A to 41E resp. 42A to 42E on the holders, as appears particularly in FIG. 4.

In this exemplary embodiment, all holders are actuated by a single respective toothed belt that is driven by a respective step motor 38, 39. Alternatively, it is also possible to rotate each holder by a predetermined angle individually by means of a step motor.

Thus, the individual masks and diaphragms can be exchanged linearly, i.e. one of masks 18A to 18E and one of diaphragms 6A to 6E can be placed in the beam path, and furthermore, both the individual masks and the individual diaphragms can be rotated by a determined angle.

In FIG. 5, a view in the direction of arrow V in FIG. 4, i.e. in the direction of the laser beam, it is seen that mask holders 31A to 31E are provided with inner ball bearing races 45A to 45E which cooperate with outer ball bearing races 46A to 46E. The mask holders are mounted on mounting plate 30.

FIG. 6 shows a section according to plane VI-VI in FIG. 4 and in the direction of the laser beam where diaphragm holders 34A to 34E and step motor 39 as well as toothed belt 37 are visible and the diaphragm holders are arranged on mounting plate 33. In FIG. 6 it is further apparent that diaphragm holders 34A to 34E each comprise an inner ball bearing race 43A to 43E that cooperates with an outer ball bearing race 44A to 44E.

Instead of the toothed belt drives for the rotation of the masks and diaphragms, worm gear and spindle drives actuated by respective common shafts that are driven by respective step motors may be used. Alternatively, however, the rotation of each mask and of each diaphragm holder by predetermined angles may also be achieved by means of a separate step motor for each mask and each diaphragm holder.

Y coordinate table axle 40C, which allows a displacement of mounting plate 30 in parallel to the propagation direction of the laser beam, serves for the precise positioning of the structured area of mask 18C that is currently in the machining position in the homogenous spot HS of the laser beam, and by displacing y coordinate table axle 40D that allows a displacement of mounting plate 33 in parallel to the propagation direction of the laser beam, a predetermined minimum distance between mask 18C that is currently in the machining position and diaphragm 6C that is currently in the machining position is adjusted, or the structured surface sides of mask 18C and diaphragm 6C, i.e. the diaphragm opening, are brought into direct contact with each other.

Figure 7:
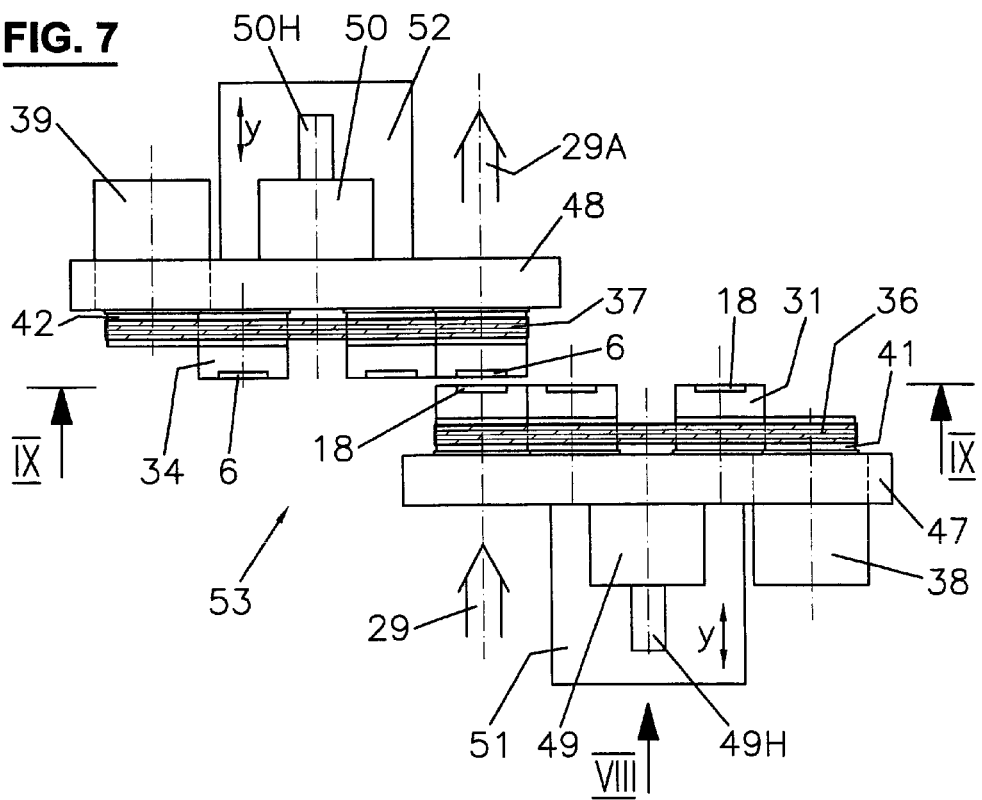
FIG. 7 shows a schematic diagram of a rotary mask and diaphragm exchanger device in a top view.

In FIGS. 7 to 9, a rotatively displaceable arrangement of masks and diaphragms is illustrated where the same masks and diaphragms as in FIGS. 4-6 with the holders, inner and outer ball bearing races, gearwheels, toothed belts, and step motors are rotatively arranged on a circular mounting plate 47 and 48, respectively, rather than linearly on a rectangular mounting plate, and either a step motor 38 or 39 drives all mask or diaphragm holders, respectively, through a toothed belt simultaneously, or each holder is separately driven by a respective step motor.

FIG. 8 is a view in the direction of arrow VIII in FIG. 7, i.e. in the direction of the laser beam, and FIG. 9 is a section according to plane IX-IX in FIG. 7. The mounting plates are driven by a respective step motor 49 with a holder 49H for mounting plate 47, and 50 with a holder 50H for mounting plate 48, and are arranged on a y coordinate table axle 51 for positioning masks 18A-18E, respectively on a y coordinate table axle 52 for positioning diaphragms 6A-6C in the y direction. The circular arrangement 53 allows a more compact design than linear arrangement 28.

Figure 11:
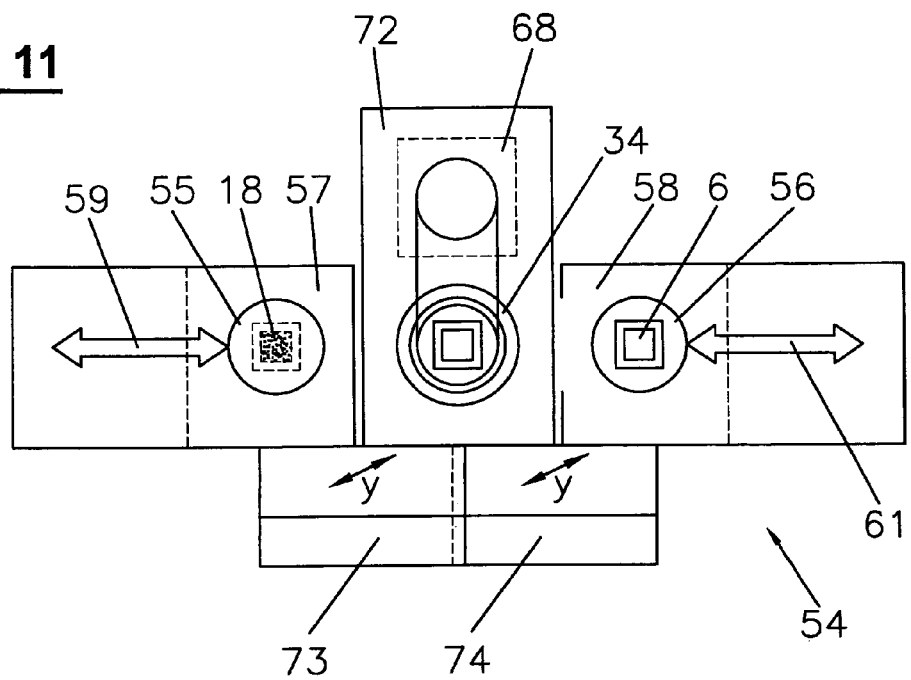
FIG. 11 shows a section according to line XI-XI in FIG. 10.
Figure 12:
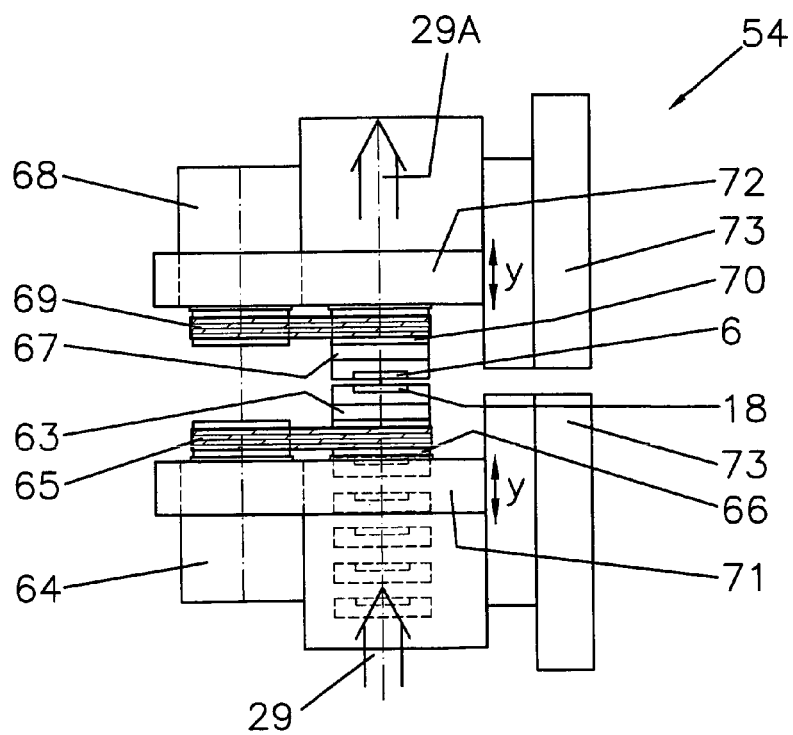
FIG. 12 shows a section according to line XII-XII in FIG. 10.

In FIGS. 10 to 12, another exchanger device 54 is illustrated where the masks and diaphragms with their holders are arranged in respective magazines 57 and 58 and can be retrieved therefrom and introduced into the beam path independently of each other. In this position, they can be rotated about their own axis.

As appears in FIG. 10, each mask 18 is fitted in a fixture 55 and each diaphragm 6 in a fixture 56, and the mask and diaphragm fixtures are arranged in respective magazines 57 and 58, the mask fixtures being arranged in a mask exchanger 59 and in a mask slider 60 and the diaphragm fixtures analogously in a diaphragm exchanger 61 and in a diaphragm slider 62, these devices being symbolized by arrows.

Particularly in FIG. 12, a section according to plane XII-XII in FIG. 10, it is seen that both the mask and the diaphragm can be rotated. To this end, the mask or diaphragm fixture is placed in a rotatably arranged mask holder 63 or diaphragm holder 67, respectively, that can be rotated by a predetermined angle by means of a step motor 64 or 68, respectively, step motor 64 driving a toothed belt 65 that is connected to a gearwheel 66 on the mask holder. In the same manner, diaphragm holder 67 is rotated through a predetermined angle by a step motor 68 that actuates a gearwheel 70 on the diaphragm holder via a toothed belt 69.

Both the mask and the diaphragm rotating mechanism are mounted on respective mounting plates 71 and 72. Mounting plate 71 of the mask holder and mask magazine 57 as well as mounting plate 72 of the diaphragm holder and diaphragm magazine 58 are arranged on respective y coordinate table axles 73, 74.

When using a complex device with two laser systems and mask and diaphragm exchanger devices for producing optical diffraction effective structures, it is indispensable to implement an effective monitoring of the produced structures. Theoretically it would be possible to structure an embossing roller or an embossing die and then to inspect these workpieces in a laboratory in order to subsequently adjust the device in the case of imperfections. However, this is too complicated and time-consuming for an efficient production of machined workpieces, more particularly embossing rollers.

It is therefore suggested to provide a measuring and adjusting device with a diffractometer arrangement according to FIG. 13 to measure the structures created while the embossing roller is being structured and to allow an adjustment of the radiation intensity, of the focal position, resp. of the position of the imaging plane, etc. Here, multiple diffraction orders are simultaneously evaluated and compared to both one another and to determined reference diffraction recordings.

The strongly simplified and schematically illustrated diffractometer arrangement 12 is mounted above embossing roller 10 and essentially comprises a semicircular arrangement of two first retaining segments 78 and 81 on which laser diodes 79 for generating a measuring beam 14 having a predetermined cross-section are mounted and, respectively, CCD camera arrays 80 for measuring the beam fractions 14 diffracted on the produced microstructures, as well as a semicircular arrangement of two second retaining segments 78F and 81F on which laser diodes 79F for generating a measuring beam 14F having a predetermined cross-section are mounted and, respectively, CCD camera arrays 80F for measuring the beam fractions 14F diffracted on the produced ripple structures. In addition, a non-represented evaluating electronics is provided. The CCD arrays are each displaceable along quarter circles in order to detect different diffraction orders, or the arrays are spatially displaceable similarly to an X-ray detector in order to record the different diffraction orders.

In this manner, for each embossing structure, the position of the diffraction order images can be automatically detected and recorded during the first spatial scan of the array, e.g. during the test of the just structured embossing rollers. The embossing roller is supported on a displacing device that is rotatable and displaceable, e.g. by means of at least one piezo actuator 82, in order to allow the precise horizontal alignment of the solid body surface that is being structured or to be structured on a rotary table 83 that is in turn arranged on a lifting table 84 and is connected to an x-y coordinate table 85.

For the in situ quality control according to FIG. 1, the monochromatic laser beam of the laser diode or the beam of the white light source of small cross-section is directed onto the basic area that is to be examined. The different intensities of the diffractions appearing under different diffraction angles due to the optical effect of the micro- and nanostructures, respectively, or the intensity distributions in the diffraction orders are recorded by diffractometer arrangement 12 and compared to each other. The intensities and more particularly the intensity distributions in the diffraction orders are determined by the geometrical shape, the depth, and the dimensional accuracy of the produced structures so that dimensional changes and insufficient structure depths can be detected. In the case of an excessive deviation from the predetermined reference structure, the structuring process is interrupted and an adaptation of the laser beam parameters and of the roller position is performed.

For the comprehensive quality control by means of the diffractometer illustrated in FIG. 13, the beam of the white light source of small cross-section is directed onto the surface of a finished structured embossing roller 10. More specifically, the surface portions microstructured by the excimer laser are irradiated with a white light source and the surface portions nanostructured by the femtosecond laser are subsequently irradiated with another white light source. The angle of incidence of the rays can be varied by displacing the white light sources in the circle arc-shaped retainers. The diffraction orders created by the optical effect of the microstructured surface portions are recorded by means of CCD camera arrays 80F, and the diffraction orders created by the optical effect of the nanostructured surface portions are recorded by means of the other CCD camera arrays 80.

For precisely recording the diffraction orders appearing under different diffraction angles, the arrays are displaceable in the circle arc-shaped retainers.

On account of the larger periods of the diffracting structures of e.g. 1 to 2 µm produced in the ta-C layers by microstructuring by means of the excimer laser according to the mask projection technique, as compared to the smaller grating periods of the ripples of e.g. 0.5 µm produced by nanostructuring by means of the femtosecond laser, the corresponding diffraction orders appear under different angles. Therefore, in order to avoid a superposition of the different diffraction orders, the radius of circle arc-shaped retainer 81 is chosen smaller than the radius of circle arc-shaped retainer 81F.

From these measurements, the following properties can be quantitatively determined over the entire structured surface area of the embossing roller:

Image sharpness, image contrast or color impression through the intensity comparison.

Size and distribution of optimally and nonoptimally structured surface portions.

Differential structuring degree, i.e. the ratio of the optimally diffracting areas of the produced structures detected in a small predetermined surface area to the size of that small surface area.

Integral structuring degree, i.e. the ratio of the summed up surface area of the optimally diffracting areas of the produced structures to the total surface area of the measuring field.

Quality figures for the micro- and nanostructured surface areas.

Regarding the application of an embossing roller structured according to the above method, e.g. a packaging foil is passed between an embossing roller structured in this manner and a mating roller and the locations where a logo is to be created according to a technique that is known per se by omitting teeth is microstructured in order to be subsequently satinized conventionally by means of a following embossing roller pair.

In such a procedure it is also possible to use a correspondingly modified and adapted version of a diffractometer arrangement for the measurement of the structures created on the packaging foil and to use the measured values for corrections in the production of the structures on the embossing roller.

Based on the above description, variations are possible within the scope of the invention. Thus it is possible instead of providing masks and diaphragms made of quartz plates to manufacture masks and/or diaphragms e.g. from $CaF_2$ or to form them by means of electrically variable crystals in which zones of high or very low transparency for the laser beam can be created. Diaphragms can also be manufactured from metal foils.

In the description, an embossing roller has been indicated as an example of the workpiece surface, but the invention is also suitable for structuring other coated or uncoated surfaces, e.g. a raised surface of an embossing die or teeth of an embossing roller, or a surface that diffracts the incident light directly such as a part of a watch case or a coin, e.g. a decorative coin or a circulation coin or a piece of jewelry.

The invention claimed is:

1. A method for structuring at least one area of an exposed surface of a hard material coated on a solid body, comprising:
    passing a homogeneous intensity distribution spot of a laser beam having laser pulse durations in a nano-second range through a mask and a diaphragm before imaging the laser beam on said at least one area using imaging optics positioned downstream of the mask and diaphragm,
    wherein the hard material comprises an amorphous carbon having a fraction of more than 50% of diamond-like $sp^3$ bonds, and
    wherein during the structuring produced by the nanosecond laser on the workpiece surface in the passing step, structures obtained are measured by means of a diffractometer and the measured values are used for adjusting an intensity of the laser beam and/or the imaging optics and a focusing optic.

2. A method according to claim 1, wherein at least one mask and one diaphragm are arranged in an exchanger device whereby a mask and a diaphragm are placeable in the beam path of the laser independently of each other.

3. A method according to claim 1, wherein the structuring is produced by the superposition of multiple microstructures, the superposing structures each forming an angle (a) with the superposed structures.

4. A method according to claim 2, wherein masks and diaphragms in the exchanger device are rotatable about themselves as well as linearly or rotatively displaceable.

5. A method according to claim 4, wherein the masks and diaphragms are arranged in respective magazines.

6. A method according to claim 1, wherein between the amorphous carbon and an underlying material, a tungsten carbide layer having a thickness between 50 and 300 nm is provided.

7. A method according to claim 1, wherein the structuring produced by the nanosecond laser is superposed with a second, ripple-shaped structure by means of a second laser having pulse durations in the pico- or femtosecond range and working according to the focus technique.

8. A method according to claim 1, further comprising manufacturing the mask or diaphragm, prior to passing the homogeneous intensity distribution spot of the laser beam through the mask and the diaphragm, using radiation of a femtosecond laser to produce a surface opaque to the laser beam on a substrate due to increased roughness.

9. A method according to claim 8, wherein the substrate is a transparent quartz plate.

10. A method for structuring at least one area of an exposed surface of a hard material coated on a solid body, comprising:
passing a homogeneous intensity distribution spot of a laser beam having laser pulse durations in a nano-second range through a mask and a diaphragm before imaging the laser beam on said at least one area using imaging optics positioned downstream of the mask and diaphragm,
wherein the hard material is selected from the group consisting of ta-C—, tungsten carbide (WC), boron carbide ($B_4C$), and silicon carbide (SiC), and
wherein during the structuring produced by the nanosecond laser on the workpiece surface in the passing step, structures obtained are measured by means of a diffractometer and the measured values are used for adjusting an intensity of the laser beam and/or the imaging optics and a focusing optic.

11. A method according to claim 10, wherein at least one mask and one diaphragm are arranged in an exchanger device whereby a mask and a diaphragm are placeable in the beam path of the laser independently of each other.

12. A method according to claim 10, wherein the structuring is produced by the superposition of multiple microstructures, the superposing structures each forming an angle (a) with the superposed structures.

13. A method according to claim 11, wherein masks and diaphragms in the exchanger device are rotatable about themselves as well as linearly or rotatively displaceable.

14. A method according to claim 13, wherein the masks and diaphragms are arranged in respective magazines.

15. A method according to claim 10, wherein the hard material is ta-C, and between the ta-C and an underlying material, a tungsten carbide layer having a thickness between 50 and 300 nm is provided.

16. A method according to claim 10, wherein the structuring produced by the nanosecond laser is superposed with a second, ripple-shaped structure by means of a second laser having pulse durations in the pico- or femtosecond range and working according to the focus technique.

17. A method according to claim 10, further comprising manufacturing the mask or diaphragm, prior to passing the homogeneous intensity distribution spot of the laser beam through the mask and the diaphragm, using radiation of a femtosecond laser to produce a surface opaque to the laser beam on a substrate due to increased roughness.

18. A method according to claim 17, wherein the substrate is a transparent quartz plate.

* * * * *